United States Patent [19]
Muszynski

[11] Patent Number: 5,814,908
[45] Date of Patent: Sep. 29, 1998

[54] BLOWER WHEEL WITH AXIAL INLET FOR VENTILATION

[75] Inventor: Jerzy Muszynski, London, Canada

[73] Assignee: Siemens Electric Limited, Mississauga, Canada

[21] Appl. No.: 641,388

[22] Filed: Apr. 30, 1996

[51] Int. Cl.[6] .............................. F04D 25/08; H02K 9/04; H02K 9/06
[52] U.S. Cl. ................................ 310/62; 310/58; 310/59; 310/63; 415/175; 417/423.1; 417/423.7; 417/366
[58] Field of Search .................................. 310/62, 63, 58, 310/59; 415/175; 416/178, 187; 417/366, 423.1, 423.7

[56] References Cited

U.S. PATENT DOCUMENTS

| | | | |
|---|---|---|---|
| 2,438,872 | 3/1948 | Fuge | 310/62 |
| 3,073,976 | 1/1963 | Wesolowski | 310/59 |
| 3,088,042 | 4/1963 | Robinson | 310/54 |
| 3,094,272 | 6/1963 | McClure | 230/117 |
| 3,188,833 | 6/1965 | Robinson | 62/505 |
| 3,235,756 | 2/1966 | Anderson | 310/60 |
| 3,512,024 | 5/1970 | Papa | 310/88 |
| 3,826,193 | 7/1974 | Rognmo et al. | 102/70.2 |
| 4,431,931 | 2/1984 | Perrier et al. | 310/61 |
| 4,456,842 | 6/1984 | Tachibana | 310/61 |
| 4,574,210 | 3/1986 | Wieland | 310/59 |
| 4,639,193 | 1/1987 | Reichert et al. | 416/184 |
| 4,659,951 | 4/1987 | Angi et al. | 310/62 |
| 4,742,257 | 5/1988 | Carpenter | 310/62 |
| 4,838,762 | 6/1989 | Savage et al. | 416/187 |
| 4,859,887 | 8/1989 | Carlsson et al. | 310/59 |
| 4,900,956 | 2/1990 | Gavilondo et al. | 310/61 |
| 4,908,537 | 3/1990 | Sismour, Jr. | 310/51 |
| 4,908,538 | 3/1990 | Geberth, Jr. | 310/59 |
| 5,019,733 | 5/1991 | Kano et al. | 310/61 |
| 5,021,696 | 6/1991 | Nelson | 310/62 |
| 5,084,641 | 1/1992 | Saima et al. | 310/51 |
| 5,241,230 | 8/1993 | Tanaka et al. | 310/62 |

FOREIGN PATENT DOCUMENTS

| | | | |
|---|---|---|---|
| 0 345 796 A | 12/1989 | European Pat. Off. | H02K 7/14 |
| 0 564 938 A | 10/1993 | European Pat. Off. | F04D 25/08 |
| 89 07716 A | 8/1989 | WIPO | F04D 29/28 |
| 92 10682 A | 6/1992 | WIPO | F04D 25/08 |

Primary Examiner—Clayton E. LaBalle
Assistant Examiner—B. Mullins

[57] ABSTRACT

An apparatus for providing ventilating air into a housing for an electric machine is disclosed. The apparatus includes a hub mounted to the housing with a raised center portion and a generally circular outer portion. The center portion is displaced upwardly from the outer portion to form an outer surface. The apparatus features a first plurality of main blades extending upwardly from the hub, a second plurality of auxilliary blades extending downwardly from the hub. Ventilating air is communicated through an axial aperture in the hub, the main blades guiding air at least partially into the central aperture and the auxilliary blades transmitting air through the housing. An apparatus including a blower wheel for providing ventilating air into a housing of an electric machine is also featured. The blower wheel features a generally dome-shaped hub. The blower wheel may feature a third plurality of impeller blades extending downwardly from the hub to transmit air into the housing.

24 Claims, 3 Drawing Sheets

BLOWER WHEEL WITH AXIAL INLET FOR VENTILATION

FIELD OF THE INVENTION

The present invention relates to an apparatus for providing ventilating air to an electric machine. In particular, the present invention relates to a blower wheel with an axial inlet for providing ventilating air to an electric motor.

BACKGROUND OF THE INVENTION

Electric machines such as electric motors generate heat during operation which, unless dissipated, may build up within the machine and damage internal components or shorten their service life. Conventional electric motors (i.e. machines) use ventilating air, which travels through holes or slots in the motor housing and cools the inner motor components. In a typical arrangement, the motor includes a fan or like structure affixed centrally to the rotating shaft of the motor with one or more sets of blades (or vanes) to direct the cooling air which then travels into the motor housing through the holes or slot. In such arrangements, the cooling air may cause undesirable or excessive audible noise as it travels through the holes or slots (e.g. due to the so-called siren effect). In such arrangements, the manner in which the fan is centrally mounted to the motor shaft also makes it particularly susceptible to imbalance or eccentricity or other structural instability), which in time (even if the blower wheel has been properly mounted) may cause a wobbling effect. In other known arrangements, the motor is configured with a central vent hole through which cooling air is drawn. Known arrangements of this type are typically more expensive, more complex and typically require a motor of greater overall axial length.

Accordingly, it would be advantageous to have a blower wheel for an electric motor that effectively cools the motor but is designed to reduce or eliminate the audible siren effect caused by the flow of ventilating air. It would be advantageous to have a blower wheel that is mounted to the rotating portion (i.e. rotor) of the motor in a secure and stable manner (e.g. at a multiple number of mounting points) that requires balancing only during the initial assembly. It would also be advantageous to have a blower wheel that can be formed as a relatively compact unitary structure of a plastic material of a relatively high strength but at a relatively low cost. It would further be advantageous to have a blower wheel adapted for greater efficiency in heating, ventilating and air conditioning (HVAC) applications. It would further be advantageous to have a blower wheel that provides for effective cooling of the motor but that shields the motor components from splashed moisture.

SUMMARY OF THE INVENTION

The present invention relates to an apparatus for providing ventilating air into a housing for an electric machine. The apparatus has a hub with a center portion and a generally circular outer portion, forming an outer surface. The apparatus also includes a first plurality of blades extending upwardly from the outer portion of the hub, a second plurality of blades extending downwardly from the outer portion of the hub, and mounting means adapted for mounting the hub to the housing. Ventilating air is communicated through an axial aperture in the center portion of the hub, the first plurality of blades being adapted to guide air at least partially toward the outer surface of the hub and at least partially into the central aperture and the second plurality of blades being adapted to transmit air through the housing.

The present invention also relates to a blower wheel for providing ventilating air into a housing of an electric machine. The blower wheel includes a generally dome-shaped hub having a raised center portion and a generally circular outer portion, the center portion being displaced upwardly from the outer portion to form a substantially continuous outer surface. The blower wheel has a first plurality of blades extending upwardly from the outer portion of the hub, a second plurality of blades extending downwardly from the center portion of the hub, a third plurality of blades extending downwardly from the outer portion of the hub, and mounting means for mounting the hub to the housing. Ventilating air is communicated through a central aperture in the center portion of the hub, the first plurality of blades being adapted to guide air at least partially toward the outer surface of the hub and at least partially into the central aperture, the second plurality of blades being adapted to transmit air into the housing and the third plurality of blades being adapted to transmit air from the housing.

DETAILED DESCRIPTION OF THE PREFERRED EMBODIMENTS

Figure 1:
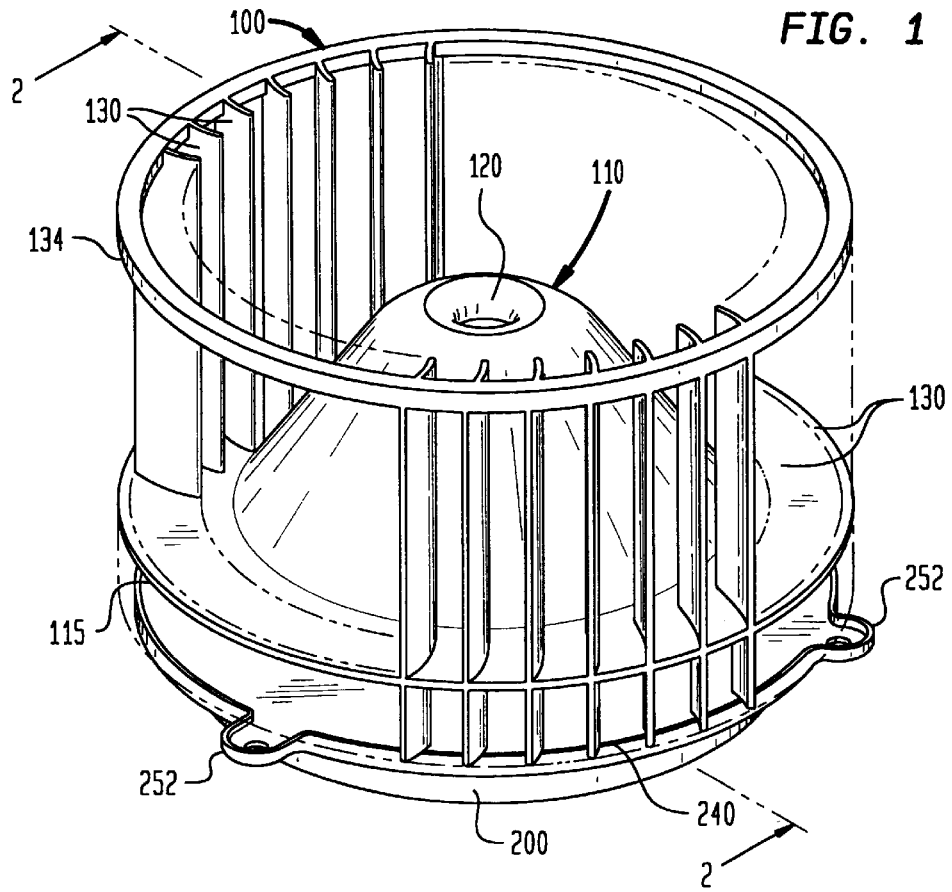
FIG. 1 is a perspective view of a blower wheel when mounted to an electric motor according to a preferred embodiment.

Referring to FIG. 1, a blower wheel 100 according to a preferred embodiment is shown as mounted to an electric motor 200 (partially visible beneath the blower wheel). Blower wheel 100 is mounted to the rotating portion (i.e. rotor 240) of motor 200 and therefore rotates about a central rotational axis of motor 200.

Figure 2:
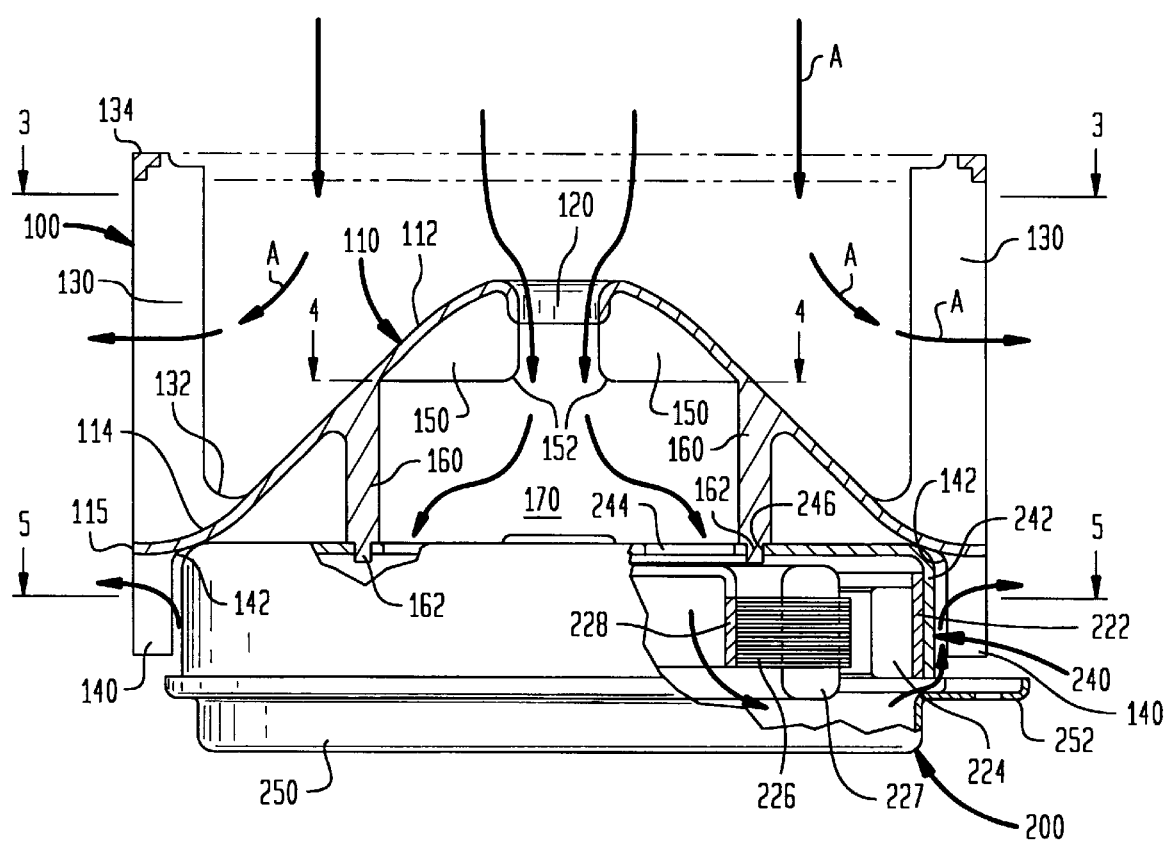
FIG. 2 is a cut-away and cross-section view of the blower wheel and motor (showing by directional arrows an air flow therethrough)

Blower wheel 100 includes a centrally-located dome-shaped hub 110 having therethrough a centrally-located (axial) ventilating air inlet 120. Referring now to FIG. 2, it is shown that hub 110 has a curved profile consisting of upper and lower parabolic-type surfaces (shown by reference numerals 112 and 114, respectively) that merge and combine to provide a smooth and continuous generally dome-shaped outer surface, this profile being optimized to provide for efficiency of ventilating air flow according to desired design criteria. Upper surface 112 of hub 110 merges and combines with a rounded inner surface of ventilating air inlet 120, this profile being optimized to minimize audible noise of ventilating air flow. Typical ventilating air flow into and around blower wheel 100 is shown by arrows (given reference letter A).

Lower surface 114 of hub 110 attains a substantially horizontal (i.e. flattened) profile at an outer radial edge 115 of hub 110, from which extend upward and vertically a plurality of upright main blades 130. A plurality of auxiliary blades 140 extend downward and vertically at the outer radial edge 115 of hub 110. As shown clearly in FIG. 1, main blades 130 are supported (i.e. mounted) at a bottom end by the outer radial edge of hub 115 and at a top end by a supporting and rigidifying structure (shown as outer ring 134) to which each main blade 130 is linked. As shown in FIG. 2, main blades 130 have a curved lower extension 132 which merges into the curved profile of lower surface 114 of hub 110. Each auxiliary blade 140 is mounted at a top end at the outer radial edge (bottom surface) of hub 110, forming at a curved upper extension 142 a smooth transition with the profile of the bottom of hub 110. (Radiused extensions 132 and 142 are provided to reduce stress concentrations that may otherwise weaken the mounting of blades 130 and 140.) According to the preferred embodiment, main blades 130 and auxiliary blades 140 are spaced uniformly about the entire perimeter (top and bottom, respectively) of outer radial edge 115 of hub 110. (Only a portion of the blades are shown in the FIGURES, for purposes of allowing visibility of other elements and features.)

The inner surface of hub 110 is also of substantially the same curved profile of the outer surface of hub 110 (as described previously). At the upper portion of hub 110 adjacent to ventilating air inlet 120 a plurality of impeller blades 150 (four are employed in the preferred embodiment) extend in a downward and inward (substantially vertical and substantially horizontal) orientation. Impeller blades 150 are shaped to fit within the inner profile of hub 110 and include a rounded exposed corner 152, which serves to reduce audible noise. Also extending in a downward and vertical direction within hub 110 are a plurality of mounting members 160, which not only provide additional structural strength for blower wheel 100 but also provide for mounting to motor 200 at a corresponding number of mounting points extending downwardly from mounting members (shown as posts 160) into corresponding apertures 246 in housing 242 of rotor 240 of motor 200. (The Rotor is typically of a metal material.) Blower wheel 100 is configured to mount to rotor 240 in a secure and stable manner at four mounting points, consisting of studs 162 (extending from posts 160) and corresponding apertures 246 (formed in the housing of rotor 240).

As shown in FIGS. 1 and 2, blower wheel 100 extends in an axial direction from housing 242 of motor 200. (In the embodiment shown in the FIGURES, the motor is of a reduced axial length design.) Visible in FIG. 2 is the end cap 250, rotor 240 (showing a typical ventilating slot 244 for ventilating air flow), the flux ring 222, a magnet 224 (typical), a lamination 226 (typical, with wire winding 227), and an inner stater support structure 228 (shown partially). End cap 250 has a mounting flange 252 for motor installation in its application.

Figure 3:
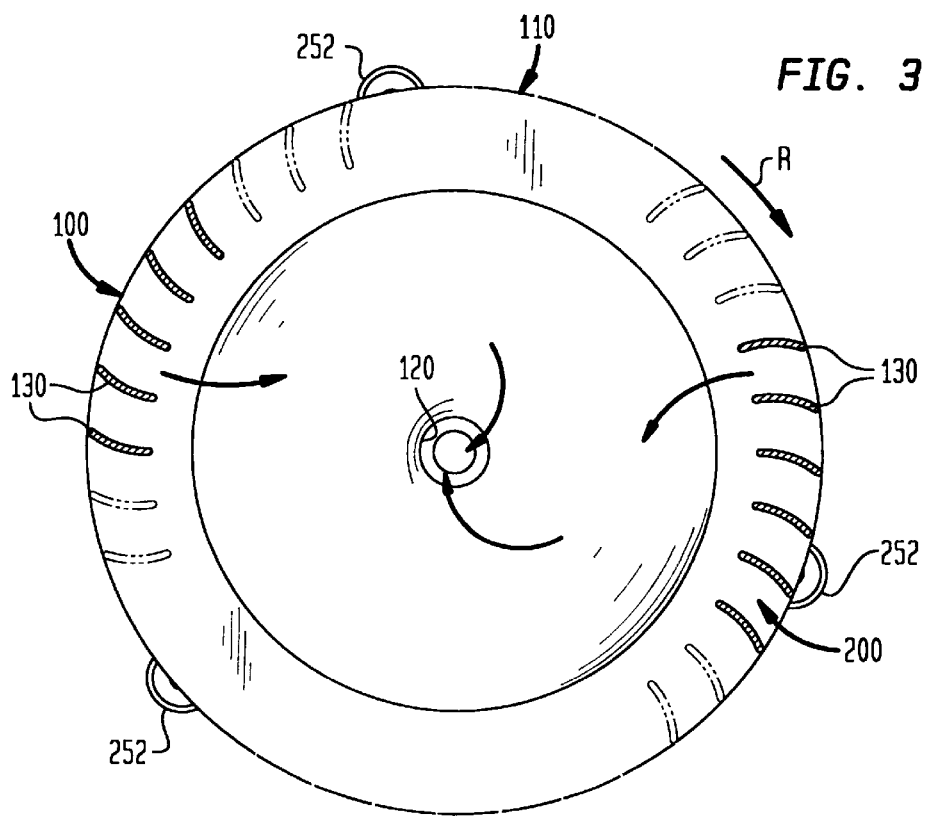
FIG. 3 is a top view of the blower wheel and motor (showing by directional arrows the air flow therethrough)
Figure 4:
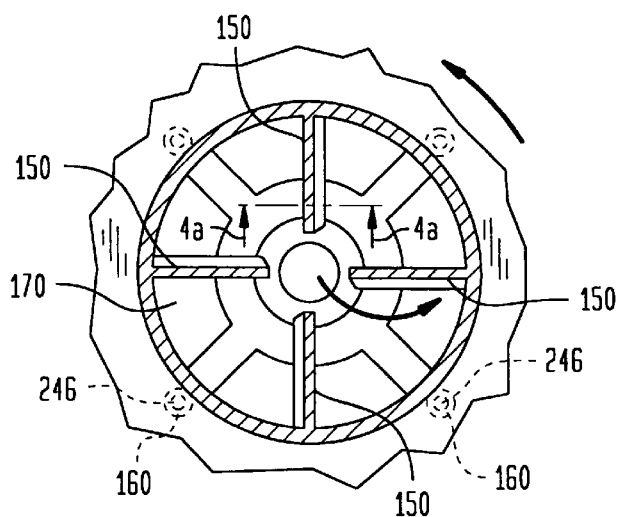
FIG. 4 is a cut-away and top view of the blower wheel (showing by directional arrows the air flow therethrough)
Figure 4A:
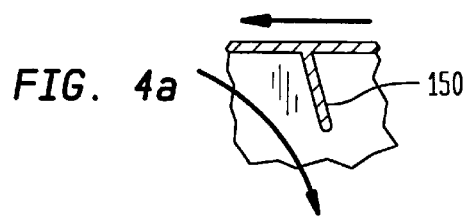
FIG. 4*a* is a cut-away (detail) and top view of a main blade of the blower wheel (showing by directional arrows the air flow therealong)

Referring now to FIG. 3, the curved cross-sectional shape and overall arrangement of main blades 130 is shown. Main blades 130 extend inwardly from the outer perimeter of blower wheel 100. In the steady-state condition, as blower wheel 100 rotates (the counterclockwise rotation of rotor 240 and blower wheel 100 is shown by a directional arrow given reference letter R) ventilating air is drawn along and between rotating (curved) main blades 130 and directed into a vortex pattern, with a portion of the ventilating air drawn into centrally-located (axial) ventilating air inlet 120 at the center of hub 110 and a portion of the air is expelled between rotating main blades 130. Referring now to FIGS. 4 and 4a, the ventilating air drawn into ventilating air inlet 120 is further forced downward into a substantially open cylindrical central chamber (shown as reference numeral 170 in FIG. 2) inside of hub 110 by rotating curved impeller blades 150.

Figure 5:
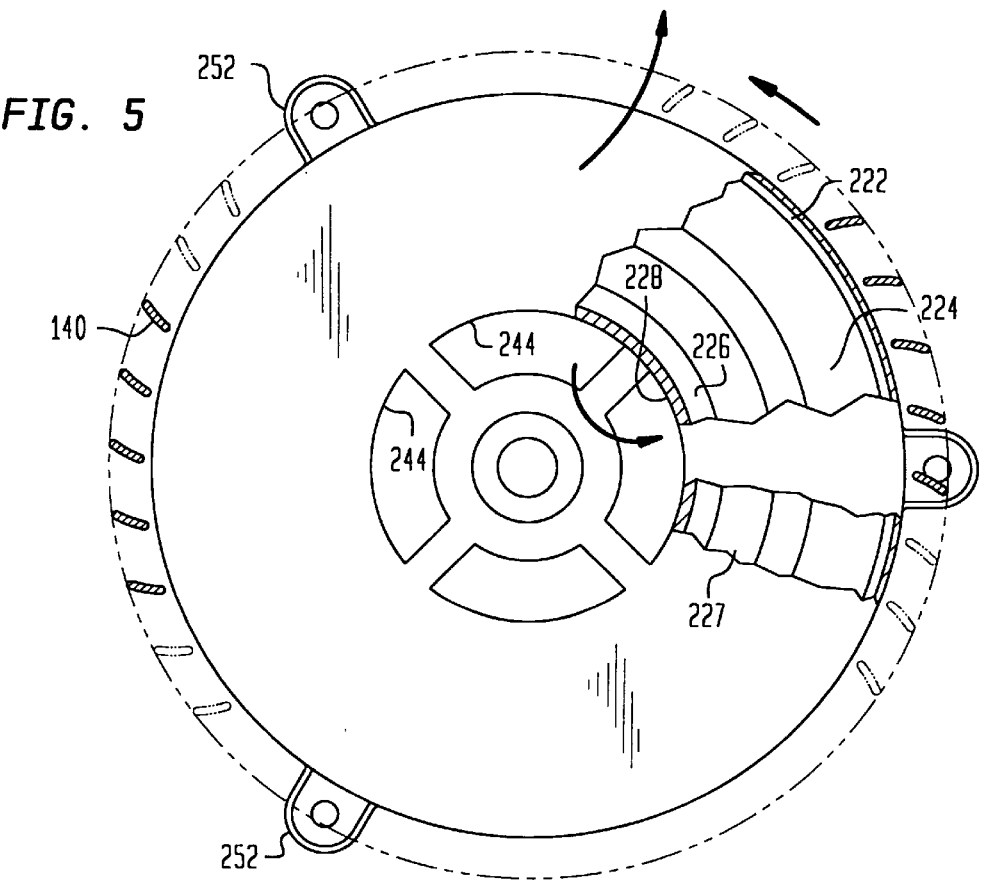
FIG. 5 is a cut-away and top view of the blower wheel and motor (showing by directional arrows the air flow therethrough).

Referring now to FIG. 5, ventilating air apertures (slots 244) in the outer surface (i.e. housing 242) of rotor 240 are shown (along with a cut-away view of certain motor components). Ventilating air is received from chamber 170 into slots 244, forced by the effect of rotating curved impeller blades 150 and drawn by the effect of rotating curved auxiliary blades 140, in conjunction with a radial ventilating air path between end cap 250 and rotor 240 (visible in FIG. 2). The number, length and shape (profile) of main blades 130, impeller blades 150, or auxiliary blades 140 can be adapted as desired within the basic structure and arrangement of blower wheel 100. (Forty main and auxiliary blades are included according to the preferred embodiment represented in the FIGURES, although a greater or lesser number can be employed as dictated by design criteria for a particular application.)

As shown, because blower wheel 100 does not mount to a central motor shaft, ventilating air inlet 120 hub 110 of blower wheel 100 is positioned for higher efficiency at a particularly desirable axial location directly in the center of blower wheel 100. This opens the center of blower wheel 100 for ventilating air flow along the axis of motor 200 (and reduces air flow impedance). The design of the motor and inner arrangement of its components can be adapted to capitalize on the benefits of the design of the blower wheel. Accordingly, the exact path of ventilating air through the motor is not limiting to the design of the blower wheel, although the volume flow of air should be sufficient to dissipate the heat generated, for example, by the brush card electronic circuitry (not shown), and to ensure that the steady-state operating temperature of the motor is suitable for the particular application. The apertures or openings in the housing of the motor that serve as an inlet for ventilating air (as well as the outlet) can be of any suitable shape at any suitable position and orientation to facilitate the flow of ventilating air along and across the various motor components in the desired manner (dictated by the design of the motor). In alternative embodiments, the motor may include an internal heat sink to enhance internal cooling. The design of the blower wheel can be readily adapted to provide a desirable (cooling) flow of ventilating air for any type of electric motor (or machine).

The shape and profile of blower wheel 100 (including the outer and inner surfaces of hub 110) optimize the flow of ventilating air to minimize noise and to shield the motor components from splashing liquids that might otherwise be able to enter housing 242. Blower wheel 100 is also designed to enhance the draw ventilating air through housing 242 (as is most evident in FIG. 2). Auxiliary blades 140 enhance the efficiency of blower wheel 100 (and the motor 200) by pulling ventilating air through motor 200 in such a manner that, for example in an automotive HVAC application, the air can be discharged within the passenger compartment of a vehicle. With this arrangement, the energy that the motor supplies to draw the volume of cooling air into the motor housing is also available for the HVAC function (not lost as it would be in a typical motor).

As shown in the preferred embodiments shown in the FIGURES, hub 110 includes impeller blades 150 in the preferred embodiment to guide the flow of ventilating air in to blower wheel 100 (and through motor 200) through one centrally-located ventilating air inlet 120. In alternative embodiments, the hub does not have impeller blades and the flow of ventilating air is drawn through motor 200 by auxiliary blades 140 (which basically pull the air through motor 200). In any preferred embodiment, the use of a single centrally-located (axial) ventilating air inlet in the blower wheel reduces the likelihood of the siren effect that may arise in known arrangements where the ventilating air inlet consists of a plurality of radially-spaced (i.e. not centrally-located) apertures (e.g. holes or slots).

According to the preferred embodiments, the particular shape of blower wheel 100, including hub 110 and blades 130, 140 and 150 (all drawn in the FIGURES to substantially reflect the shape and profile of a preferred embodiment) and mounting arrangement with respect to motor 200 provide for an efficient (and relatively leak-free) flow of ventilating air in and around motor 200 as well as protection of the motor components from splashing moisture. In alternative embodiments, any type of fastener or fastening arrangement (such as bolts, clips or rivets, etc.) can be employed to mount the blower wheel to the motor. The plurality of radially-extended mounting points provides for additional stability during rotation of the blower wheel in comparison to known arrangements having a single or central mounting location for a cooling fan.

Blower wheel 100 can readily be configured for use in a wide variety of applications or with a wide variety of motor designs. According to the preferred embodiments, the arrangement and orientation of the blower wheel may serve to provide a noise-deadening function, as is desirable in certain applications. While the embodiment shown is well-suited for a short axial length motor (as is shown), other embodiments can be adapted to suit other motor shapes and designs. In any preferred embodiment, the blower wheel is mounted (or otherwise fastened) in a secure and stable manner at some point (or points) on the rotating portion of the motor.

While the blower wheel according to the preferred embodiment includes a hub, main blades, impeller blades, and auxiliary blades, all of the basic curved shapes and profiles as depicted in the FIGURES, as would be known to one of skill in the art who has reviewed this disclosure, the shapes and profiles of these components (and even the overall configuration) of the blower wheel may be modified as necessary for a particular application while not departing from the present invention. (For example, the hub may be of other shapes, such as a conical shape.)

In any preferred embodiment, the blower wheel is formed from a plastic material, although in alternative embodiments it can be made of other suitable materials, including metals or composite materials. According to a particularly preferred embodiment, the blower wheel is formed as a unitary assembly of a molded plastic material of suitable strength, resilience and durability for the intended application. In a further particularly preferred embodiment, the blower wheel is made of a highly durable yet sufficiently rigid plastic material, such as "NYLON".

It is understood that, while the detailed drawings, specific examples, and particular components values given describe preferred embodiments of the present invention, they serve the purpose of illustration only. The apparatus of the invention is not limited to the precise details and conditions disclosed. Further, although particular shapes and aperture dimensions have been shown, various other shapes, geometries and dimensions could be utilized for the various components of the motor. Other substitutions, modifications, changes and omissions may be made in the design, operating conditions and arrangement of the preferred embodiments without departing from the spirit of the invention as expressed in the appended claims.

What is claimed is:

1. An apparatus for providing ventilating air into a housing for an electric machine, which comprises:
   a hub having a center portion and a generally circular outer portion forming an outer surface, the center portion defining a longitudinal axis and having a ventilation aperture extending therethrough in general alignment with the longitudinal axis and being dimensioned to permit air to pass through the center portion;
   a first plurality of blades extending upwardly from the outer portion of the hub;
   a second plurality of blades extending downwardly from the outer portion of the hub; and
   mounting means adapted for mounting the hub to the housing;
   wherein air is communicated through the ventilation aperture in the center portion of the hub, the first plurality of blades being adapted to guide air at least partially toward the outer surface of the hub and at least partially into the ventilation aperture and the second plurality of blades being adapted to transmit air through the housing.

2. The apparatus of claim 1 further comprising a third plurality of blades extending downwardly from the center portion of the hub and being adapted to transmit air into the housing.

3. The apparatus of claim 1 wherein the hub is generally dome-shaped.

4. The apparatus of claim 1 further comprising a rigidifying member, each of the first plurality of blades being coupled at a distal end to the rigidifying member.

5. The apparatus of claim 1 wherein the mounting means comprises a plurality of mounting members extending downwardly from the center portion of hub.

6. The apparatus of claim 3 wherein each of the plurality of mounting members extends in a substantially vertical direction.

7. The apparatus of claim 3 wherein each of the plurality of mounting members is a post with a stud adapted to extend into an aperture in the housing.

8. The apparatus of claim 2 wherein the hub, the first plurality of blades, the second plurality of blades, the third plurality of blades, and the mounting means are formed as an integral assembly.

9. The apparatus of claim 8 wherein the integral assembly is made of a plastic material.

10. The apparatus of claim 1 wherein the first plurality of blades includes at least 40 blades and the second plurality of blades includes at least 40 blades.

11. The apparatus of claim 1 wherein the first plurality of blades extends from the hub in a substantially vertical direction.

12. The apparatus of claim 1 wherein the second plurality of blades extends in a substantially vertical direction.

13. The apparatus of claim 2 wherein each of the third plurality of blades extends in a substantially vertical direction.

14. The apparatus of claim 1 wherein the first plurality of blades extends a first vertical distance from the outer portion of the hub and the central portion of the hub extends a second vertical distance from the hub, the first distance being greater than the second distance.

15. The apparatus of claim 1 wherein the mounting means is adapted to provide a substantially leak-proof interface with the housing.

16. The apparatus of claim 1 wherein the mounting means is adapted to provide a substantially splash-proof interface with the machine.

17. A blower wheel for providing ventilating air into a housing of an electric machine, which comprises:

a generally dome-shaped hub with a center portion and a generally circular outer portion, the center portion being displaced upwardly from the outer portion to form a substantially continuous outer surface, the center portion defining a longitudinal axis and having a ventilation aperture extending therethrough in general alignment with the longitudinal axis and being dimensioned to permit air to pass through the center portion;

a first plurality of blades extending upwardly from the outer portion of the hub;

a second plurality of blades extending downwardly from the center portion of the hub;

a third plurality of blades extending downwardly from the outer portion of the hub; and mounting means for mounting the hub to the housing;

wherein air is communicated through the ventilation aperture in the center portion of the hub, the first plurality of blades being adapted to guide air at least partially toward the outer surface of the hub and at least partially into the ventilation aperture, the second plurality of blades being adapted to transmit air into the housing and the third plurality of blades being adapted to transmit air from the housing.

18. The blower wheel of claim 17 wherein the central aperture has a substantially rounded circular rim adapted to reduce noise.

19. The blower wheel of claim 17 wherein the outer portion of the hub is substantially horizontal at its distal end.

20. The blower wheel of claim 17 wherein the mounting means comprises at least one member extending downwardly from the hub.

21. An apparatus for providing ventilating air into a housing of an electric motor, which comprises:

a hub mountable to the housing of the electric motor, the hub including a center portion and an outer portion, the center portion having a generally dome-shaped configuration and defining an inner chamber, and a ventilation aperture in general alignment with a longitudinal axis of the hub, the ventilation aperture dimensioned to permit air to pass into the inner chamber;

a first plurality of blades extending from the outer portion of the hub in a first axial direction, the first plurality of blades dimensioned to direct air at least through the ventilation aperture;

a second plurality of blades extending within the inner chamber of the center portion of the hub in a second axial direction, the second axial direction being different than the first axial direction, the second plurality of blades dimensioned to direct air at least from the ventilation aperture to the inner chamber of the hub; and a third plurality of blades extending from the outer portion of the hub in the second axial direction, the third plurality of blades dimensioned to direct air from the inner chamber to the housing of the electric motor.

22. In combination:

an electric motor including a rotor mounted for rotational movement, the rotor including a rotor housing having a ventilation opening therethrough; and a blower wheel mounted to the rotor for providing ventilating air to the electric motor, the blower wheel including:

a hub having a center portion and an outer portion, the center portion defining a longitudinal axis and having a ventilation aperture extending therethrough in general alignment with the longitudinal axis and being dimensioned to permit air to pass through the center portion;

a first set of blades extending in a first axial direction from the outer portion of the hub and being dimensioned to direct air at least through the ventilation aperture; and a second set of blades extending in a second axial direction, different from the first axial direction, from the outer portion of the hub and being dimensioned to direct air through the ventilation opening of the rotor housing.

23. An apparatus in combination as recited in claim 22, wherein the hub further comprises a third set of blades extending in the second axial direction from the center portion of the hub, the third set of blades being dimensioned to direct air toward the second set of blades.

24. An apparatus in combination as recited in claim 22, wherein one of the rotor housing and the hub includes a locking member extending therefrom; and wherein the other of the rotor housing and the hub includes a locking aperture correspondingly dimensioned to receive the locking member to thereby mount the rotor housing to the blower wheel.

* * * * *